United States Patent
Konig

(10) Patent No.: US 12,100,937 B2
(45) Date of Patent: *Sep. 24, 2024

(54) METHOD OF MANUFACTURING SPARK PLUG ELECTRODE WITH ELECTRODE TIP DIRECTLY THERMALLY COUPLED TO HEAT DISSIPATING CORE

(71) Applicant: FEDERAL-MOGUL IGNITION GMBH, Neuhaus-Schierschnitz (DE)

(72) Inventor: Daniel Konig, Rodental (DE)

(73) Assignee: FEDERAL-MOGUL IGNITION GMBH, Neuhaus-Schierschnitz (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/382,732

(22) Filed: Oct. 23, 2023

(65) Prior Publication Data

US 2024/0047948 A1 Feb. 8, 2024

Related U.S. Application Data

(63) Continuation of application No. 17/874,786, filed on Jul. 27, 2022, now Pat. No. 11,837,852.

(51) Int. Cl.
*H01T 21/02* (2006.01)
*B22F 7/08* (2006.01)
(Continued)

(52) U.S. Cl.
CPC .............. *H01T 13/39* (2013.01); *B22F 7/08* (2013.01); *H01T 21/02* (2013.01); *B33Y 80/00* (2014.12)

(58) Field of Classification Search
CPC ......... H01T 21/02; H01T 13/16; H01T 13/32; H01T 13/39
See application file for complete search history.

(56) References Cited

U.S. PATENT DOCUMENTS 3,119,944 A 1/1964 Lentz et al.
4,786,267 A 11/1988 Toya et al.
(Continued)

FOREIGN PATENT DOCUMENTS

CN 103094842 A 5/2013
CN 103457160 A 12/2013
(Continued)

OTHER PUBLICATIONS

US 10,576,577, 3/2020, Didier Le Breis (withdrawn)
(Continued)

*Primary Examiner* — Abdulmajeed Aziz
*Assistant Examiner* — Steven Y Horikoshi
(74) *Attorney, Agent, or Firm* — REISING ETHINGTON P.C.

(57) ABSTRACT

A spark plug electrode includes an electrode tip that is attached to or formed on an electrode base so that the electrode tip is directly thermally coupled to a heat dissipating core through an opening in the electrode base. This direct thermal coupling may take place on a side surface of a ground electrode or a center electrode and removes thermal energy away from the electrode tip in order to reduce thermal and/or other stresses. The heat dissipating core may have one or more core extensions that diverge or branch off of a core main body and extend into the opening in the electrode base for better thermal coupling to the electrode tip. The electrode tip can be attached to the electrode base via welding or it can be formed on the electrode base using a suitable additive manufacturing process, such as a powder bed fusion technique.

20 Claims, 6 Drawing Sheets

(51) Int. Cl.
  *H01T 13/39* (2006.01)
  *B33Y 80/00* (2015.01)

(56) References Cited

U.S. PATENT DOCUMENTS

| | | | |
|---|---|---|---|
| 5,273,474 A | 12/1993 | Oshima et al. | |
| 5,347,193 A * | 9/1994 | Oshima | H01T 13/39 |
| | | | 313/142 |
| 5,461,276 A | 10/1995 | Matsutani et al. | |
| 5,510,667 A | 4/1996 | Loeffler et al. | |
| 5,866,973 A | 2/1999 | Kagawa et al. | |
| 5,977,695 A | 11/1999 | Osamura et al. | |
| 6,621,198 B2 | 9/2003 | Kanao et al. | |
| 7,385,339 B2 | 6/2008 | Lineton et al. | |
| 7,385,355 B2 | 6/2008 | Kusunoki et al. | |
| 7,521,850 B2 | 4/2009 | Lykowski | |
| 7,569,979 B2 | 8/2009 | Lykowsi et al. | |
| 7,666,047 B2 | 2/2010 | Suzuki et al. | |
| 7,740,683 B2 | 6/2010 | Thorsson et al. | |
| 7,795,790 B2 | 9/2010 | Lineton | |
| 7,808,165 B2 | 10/2010 | Kowalski | |
| 7,891,095 B2 | 2/2011 | Jonsson et al. | |
| 8,348,709 B1 | 1/2013 | Passman et al. | |
| 8,354,782 B2 | 1/2013 | Sakayanagi et al. | |
| 8,427,038 B2 | 4/2013 | Taido et al. | |
| 8,841,828 B2 | 9/2014 | Igarashi et al. | |
| 8,896,193 B2 | 11/2014 | Kataoka | |
| 8,926,879 B2 | 1/2015 | Vagt et al. | |
| 8,987,981 B2 | 3/2015 | Imai | |
| 9,077,158 B2 | 7/2015 | Murayama et al. | |
| 9,130,358 B2 | 9/2015 | Ma | |
| 9,219,351 B2 | 12/2015 | Walker, Jr. | |
| 9,636,869 B2 | 5/2017 | Kroll et al. | |
| 9,662,840 B1 | 5/2017 | Buller et al. | |
| 9,698,576 B2 | 7/2017 | Niessner et al. | |
| 9,713,843 B2 | 7/2017 | Snyder et al. | |
| 9,739,192 B2 | 8/2017 | Willi | |
| 9,800,023 B2 | 10/2017 | Niessner et al. | |
| 9,806,500 B2 | 10/2017 | Sakairi et al. | |
| 9,843,045 B2 | 12/2017 | Yuge et al. | |
| 9,853,423 B1 | 12/2017 | Sumoyama et al. | |
| 9,871,351 B2 | 1/2018 | Thomas et al. | |
| 9,893,361 B1 | 2/2018 | Jaker et al. | |
| 9,948,069 B2 | 4/2018 | Segawa et al. | |
| 9,991,680 B2 | 6/2018 | Ikeda et al. | |
| 10,008,832 B2 | 6/2018 | Quest et al. | |
| 10,259,163 B2 | 4/2019 | Eilken et al. | |
| 10,328,526 B2 | 6/2019 | Ols et al. | |
| 10,415,122 B2 | 9/2019 | Barthelemy et al. | |
| 10,472,698 B2 | 11/2019 | Zeniya et al. | |
| 10,539,255 B2 | 1/2020 | Kroll et al. | |
| 10,559,944 B2 | 2/2020 | Kaji et al. | |
| 10,744,590 B2 | 8/2020 | Maier et al. | |
| 10,897,123 B2 | 1/2021 | Abe et al. | |
| 10,913,257 B2 | 2/2021 | Coupland et al. | |
| 11,189,993 B2 | 11/2021 | Grabner et al. | |
| 2001/0013746 A1 | 8/2001 | Kanao et al. | |
| 2001/0025617 A1 | 10/2001 | Kanao | |
| 2004/0100178 A1 | 5/2004 | Kanao et al. | |
| 2004/0129683 A1 | 7/2004 | Torii et al. | |
| 2004/0140745 A1 | 7/2004 | Hrastnik | |
| 2006/0028106 A1 | 2/2006 | Lineton et al. | |
| 2007/0013126 A1 | 1/2007 | Mizubata et al. | |
| 2007/0132354 A1 | 6/2007 | Scott et al. | |
| 2007/0236123 A1 | 10/2007 | Lykowski et al. | |
| 2009/0277540 A1 | 11/2009 | Langlet | |
| 2012/0194056 A1 | 8/2012 | Ma | |
| 2013/0069516 A1 | 3/2013 | Sumoyama et al. | |
| 2013/0313960 A1 | 11/2013 | Francesconi | |
| 2014/0152170 A1 | 1/2014 | Kasuya et al. | |
| 2014/0049151 A1 | 2/2014 | Murayama et al. | |
| 2014/0170598 A1 | 6/2014 | Abend et al. | |
| 2015/0145169 A1 | 5/2015 | Liu et al. | |
| 2015/0223869 A1 | 8/2015 | Mayer et al. | |
| 2016/0003150 A1 | 1/2016 | Dicintio et al. | |
| 2016/0082511 A1 | 3/2016 | Cui et al. | |
| 2016/0218489 A1 | 7/2016 | Dicintio et al. | |
| 2016/0243650 A1 | 8/2016 | Lin et al. | |
| 2016/0263832 A1 | 9/2016 | Bui et al. | |
| 2016/0271696 A1 | 9/2016 | Kamakura | |
| 2016/0298213 A1 | 10/2016 | Yang et al. | |
| 2016/0312338 A1 | 10/2016 | Miller | |
| 2017/0033539 A1 * | 2/2017 | Segawa | H01T 13/50 |
| 2017/0040917 A1 | 2/2017 | Chang et al. | |
| 2017/0062798 A1 | 3/2017 | Wang et al. | |
| 2017/0107946 A1 | 4/2017 | Le Cras et al. | |
| 2017/0167357 A1 | 6/2017 | Maier | |
| 2017/0167358 A1 | 6/2017 | Maier et al. | |
| 2017/0179472 A1 | 6/2017 | Allie et al. | |
| 2017/0251546 A1 | 8/2017 | Ikeda et al. | |
| 2017/0253536 A1 | 9/2017 | Danforth et al. | |
| 2017/0264083 A1 | 9/2017 | Niessner et al. | |
| 2017/0304894 A1 | 10/2017 | Buller | |
| 2017/0331260 A1 | 11/2017 | Quest et al. | |
| 2017/0350590 A1 | 12/2017 | Choudhri et al. | |
| 2018/0056604 A1 | 3/2018 | Sands et al. | |
| 2018/0366918 A1 * | 12/2018 | Sumoyama | C22C 5/04 |
| 2018/0369919 A1 | 12/2018 | Burkhardt | |
| 2019/0001415 A1 | 1/2019 | Morimoto et al. | |
| 2019/0009335 A1 | 1/2019 | Kloft et al. | |
| 2019/0366585 A1 | 12/2019 | Nagai et al. | |
| 2019/0375049 A1 | 12/2019 | Werner | |
| 2020/0021084 A1 | 1/2020 | Kimura | |
| 2020/0207069 A1 * | 7/2020 | Coupland | B22F 10/25 |
| 2020/0251872 A1 | 8/2020 | Drachenberg et al. | |
| 2020/0256308 A1 | 8/2020 | Assaad | |
| 2020/0269352 A1 | 8/2020 | Maurer et al. | |
| 2020/0399744 A1 | 12/2020 | Smith et al. | |
| 2021/0053119 A1 | 2/2021 | Geisen | |
| 2021/0086279 A1 | 3/2021 | Clover et al. | |
| 2021/0273417 A1 | 9/2021 | Ritter et al. | |
| 2022/0016800 A1 | 1/2022 | Lescoche et al. | |
| 2022/0032499 A1 | 2/2022 | Lescoche et al. | |
| 2022/0045485 A1 | 2/2022 | Resnick | |
| 2022/0059999 A1 | 2/2022 | Ritsema et al. | |
| 2022/0140576 A1 | 5/2022 | Niessner et al. | |
| 2022/0149598 A1 | 5/2022 | Trebbels | |

FOREIGN PATENT DOCUMENTS

| | | |
|---|---|---|
| CN | 203387050 U | 1/2014 |
| CN | 104923797 A | 9/2015 |
| CN | 206065410 U | 4/2017 |
| CN | 106735273 A | 5/2017 |
| CN | 106881509 A | 6/2017 |
| CN | 107891200 A | 4/2018 |
| CN | 107974682 A | 5/2018 |
| CN | 208299203 U | 12/2018 |
| CN | 109332694 A | 2/2019 |
| CN | 110125399 A | 8/2019 |
| CN | 110899695 A | 3/2020 |
| CN | 110539386 B | 2/2021 |
| CZ | 2013291 A3 | 3/2014 |
| CZ | 2013212 A3 | 10/2014 |
| CZ | 306282 B6 | 11/2016 |
| DE | 102012223239 A1 | 6/2014 |
| DE | 102016209094 A1 | 11/2017 |
| DE | 112011102588 B4 | 2/2018 |
| DE | 102016216963 A1 | 3/2018 |
| DE | 102017221136 A1 | 5/2019 |
| DE | 102017221137 A1 | 5/2019 |
| DE | 102018200349 A1 | 7/2019 |
| DE | 102018212894 A1 | 2/2020 |
| DE | 102019218408 A1 | 2/2021 |
| EP | 1594200 B1 | 11/2007 |
| EP | 1596482 B1 | 6/2011 |
| EP | 2727898 A1 | 5/2014 |
| EP | 3035458 A1 | 6/2016 |
| EP | 3263524 A1 | 1/2018 |
| FR | 3095149 A1 | 10/2020 |
| GB | 556330 A | 9/1943 |
| GB | 2544465 A | 5/2017 |
| JP | S6355880 A | 3/1988 |
| JP | H0513145 A | 1/1993 |

(56) References Cited

FOREIGN PATENT DOCUMENTS

| | | | |
|---|---|---|---|
| JP | H0513147 A | 1/1993 |
| JP | H0554953 A | 3/1993 |
| JP | H0567488 A | 3/1993 |
| JP | H0582235 A | 4/1993 |
| JP | H05101869 A | * | 4/1993 |
| JP | H05159855 A | 6/1993 |
| JP | H05182742 A | 7/1993 |
| JP | H05242952 A | 9/1993 |
| JP | 1022054 A | 1/1998 |
| JP | 10106715 A | 4/1998 |
| JP | H10106716 A | 4/1998 |
| JP | 3043475 B2 | 5/2000 |
| JP | 3128270 B2 | 1/2001 |
| JP | 3192450 B2 | 7/2001 |
| JP | 3359347 B2 | 12/2002 |
| JP | 2002359053 A | 12/2002 |
| JP | 2005150011 A | 6/2005 |
| JP | 2006185928 A | 7/2006 |
| JP | 4295064 B2 | 7/2009 |
| JP | 2009270130 A | 11/2009 |
| JP | 2013037807 A | 2/2013 |
| JP | 2014072037 A | 4/2014 |
| JP | 6288287 B2 | 3/2018 |
| JP | 6344966 B2 | 6/2018 |
| JP | 6598081 B2 | 10/2019 |
| JP | 2021026873 A | 2/2021 |
| KR | 100400101 B1 | 9/2003 |
| WO | 9807220 A1 | 2/1998 |
| WO | 2005025783 A1 | 3/2005 |
| WO | 2006017687 A2 | 2/2006 |
| WO | 2013128416 A2 | 9/2013 |
| WO | 2015173790 A1 | 11/2015 |
| WO | 2016116385 A1 | 7/2016 |
| WO | 2016156973 A1 | 10/2016 |
| WO | 2017143961 A1 | 8/2017 |
| WO | 2017221010 A1 | 12/2017 |
| WO | 2019025795 A1 | 2/2019 |
| WO | WO2019025796 A1 | 2/2019 |
| WO | WO2020109715 A1 | 6/2020 |
| WO | WO2020109716 A1 | 6/2020 |
| WO | 2021253061 A1 | 12/2021 |
| WO | 2022040544 A1 | 2/2022 |

OTHER PUBLICATIONS

Pavel Krakhmalev et a.; Microstructure, Solidification Texture, and Thermal Stability of 316 L Stainless Steel Manufactured by Laser Powder Bed Fusion; MDPI Journal; Aug. 15, 2018.

Terrence E. Johnson et al.; Three-dimensional Projection-based Topology Optimization for Prescribed-angle Self-supporting Additively Manufactured Structures.

* cited by examiner

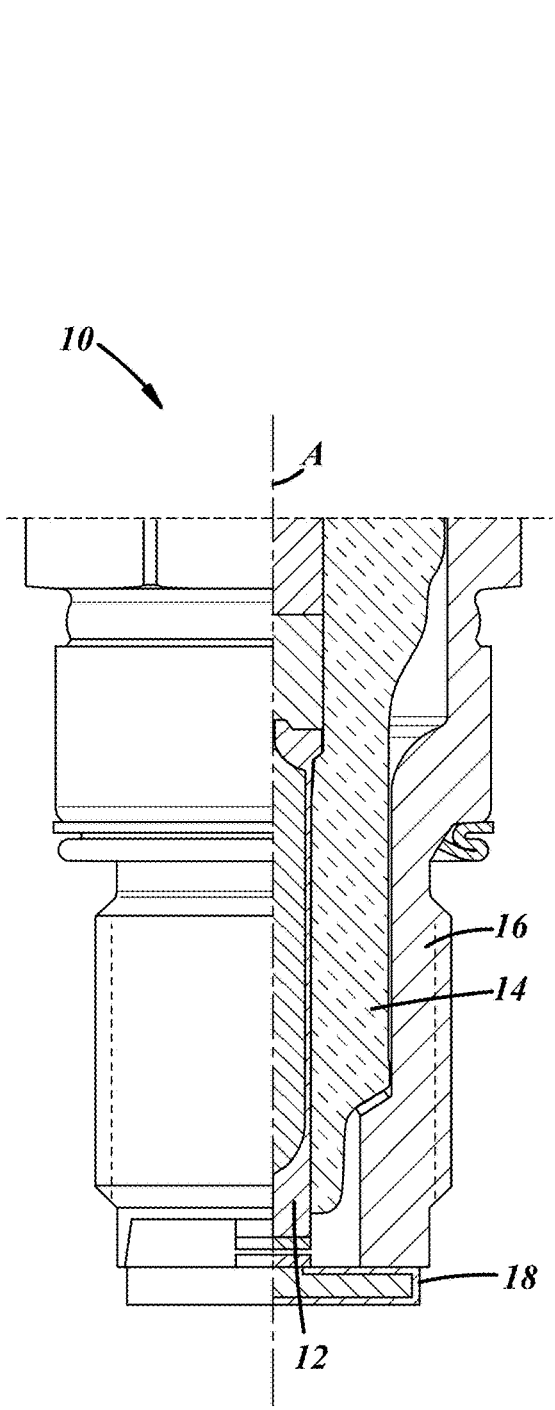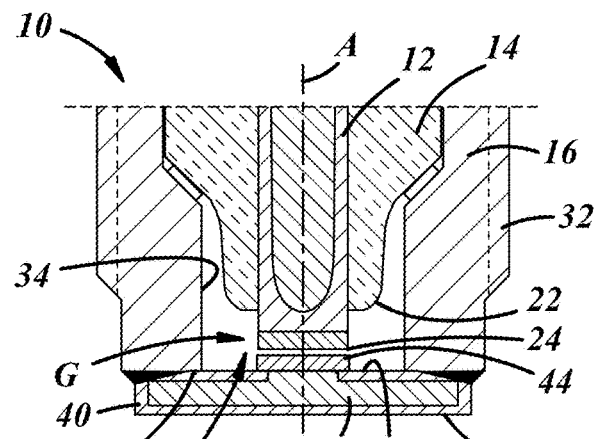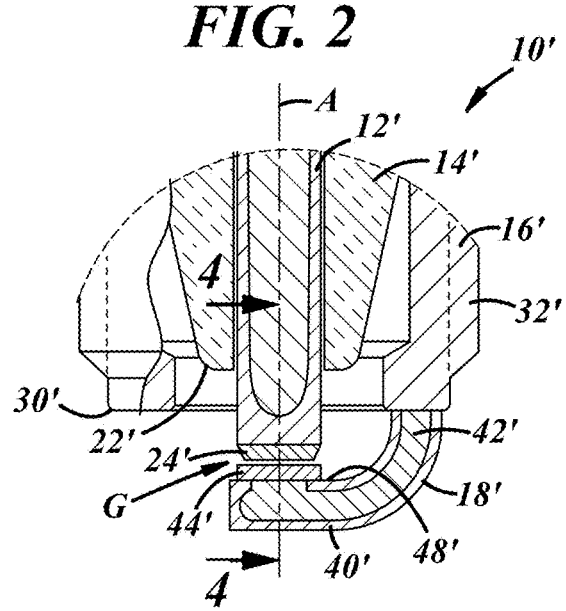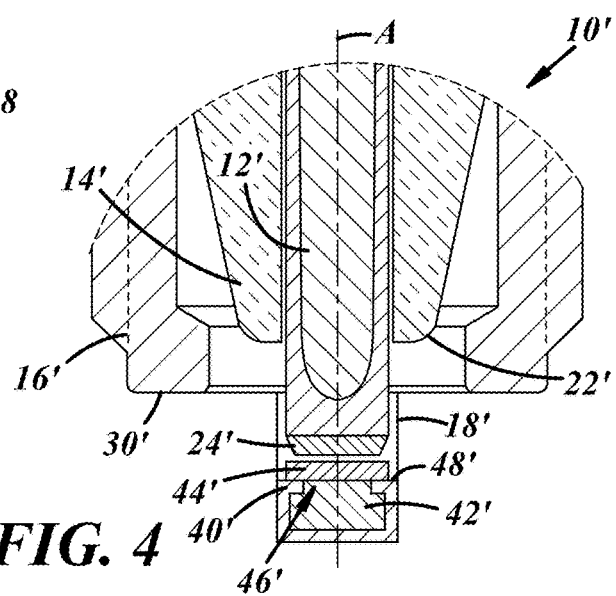
FIG. 1
FIG. 2
FIG. 3
FIG. 4

METHOD OF MANUFACTURING SPARK PLUG ELECTRODE WITH ELECTRODE TIP DIRECTLY THERMALLY COUPLED TO HEAT DISSIPATING CORE

CROSS-REFERENCE TO RELATED APPLICATION

This application is a continuation of U.S. Non-Provisional application Ser. No. 17/874,786 filed Jul. 27, 2022, the entire contents of which are hereby incorporated by reference.

FIELD

The present invention generally relates to spark plugs and other ignition devices and, in particular, to spark plug electrodes.

BACKGROUND

Spark plugs are used to initiate combustion in internal combustion engines. Typically, spark plugs ignite an air/fuel mixture in a combustion chamber so that a spark is produced across a spark gap between two or more electrodes. The ignition of the air/fuel mixture by means of the spark triggers a combustion reaction in the combustion chamber, which is responsible for the power stroke of the engine. The high temperatures, the high electrical voltages, the rapid repetition of combustion reactions, and the presence of corrosive materials in the combustion gases can create a harsh environment in which the spark plug must function. The harsh environment can contribute to an erosion and/or corrosion of the electrodes, which can negatively affect the performance of the spark plug over time.

To reduce erosion and/or corrosion of the electrodes, various kinds of precious metals and alloys have been used, such as those having platinum and iridium. These materials are expensive, however, particularly iridium. Consequently, the manufacturers of spark plugs try to minimize the quantity of precious metals used in an electrode. One approach involves using precious metals only on an electrode tip or on a sparking section of the electrodes, i.e. in the place where a spark jumps across the spark gap, as opposed to the entire electrode body itself. However, this approach faces certain challenges, including those pertaining to cooling the precious metal electrode tip.

If the precious metal tip is not adequately cooled and a substantial amount of heat is allowed to build up, thermal and/or other stresses and loads can develop due to the different properties of the materials (e.g., different coefficients of thermal expansion, different melting temperatures, etc.). Ground electrodes are among the spark plug components having the highest thermal loads. Thus, if the thermal and/or other stresses in the ground electrode, particularly at the joint that attaches the precious metal tip to the ground electrode, are not adequately addresses, it can lead to increased electrode wear and a higher risk of pre-ignition.

The spark plug electrode described herein is designed to address one or more of the drawbacks and challenges mentioned above.

SUMMARY

According to one embodiment, there is provided a spark plug electrode, comprising: an electrode base that includes a side surface with an opening; a heat dissipating core that is at least partially located within the electrode base and includes a core main body and a core extension, the core extension diverges from the core main body and extends at least partially into the opening; and an electrode tip that is attached to or formed on the side surface of the electrode base such that the electrode tip covers the opening, wherein the electrode tip is directly thermally coupled to the core extension of the heat dissipating core through the opening.

According to another embodiment, there is provided a spark plug electrode, comprising: an electrode base that includes a side surface with an opening; a heat dissipating core that is at least partially located within the electrode base; and an electrode tip that is attached to or formed on the side surface of the electrode base and includes a tip main body and a tip extension that extends at least partially into the opening, a width dimension of the tip main body is larger than a width dimension of the tip extension and a width dimension of the opening such that the electrode tip overhangs and covers the opening, wherein the tip extension of the electrode tip is directly thermally coupled to the heat dissipating core through the opening.

In accordance with the various embodiments, the spark plug electrode may have any one or more of the following features, either singly or in any technically feasible combination:

- the electrode base includes a nickel-based material, the heat dissipating core includes a copper-based material, and the electrode tip includes a precious metal-based material, the precious metal-based material includes at least one precious metal selected from the group consisting of: iridium, platinum, ruthenium, palladium or rhodium;
- the core main body includes first and second elongated sides, the core extension diverges from the first elongated side and extends at least partially into the opening;
- the core extension extends partially into the opening such that a contact surface of the core extension is recessed from the side surface of the electrode base;
- the core extension extends fully into the opening such that a contact surface of the core extension is flush with the side surface of the electrode base;
- the core extension extends fully into and through the opening such that a contact surface of the core extension protrudes beyond the side surface of the electrode base;
- the core extension extends fully into and through the opening such that one or more extension tabs of the core extension protrude beyond the side surface of the electrode base and fill a volume behind the electrode tip such that a mechanical interlock is established between the electrode tip and the heat dissipating core;
- further comprising a thermal coupling piece that is at least partially located between the electrode tip and the heat dissipating core and includes thermally conductive material, the electrode tip is directly thermally coupled to the core extension of the heat dissipating core through the opening via the thermal coupling piece;
- the electrode tip has a width dimension, the opening has a width dimension, and the width dimension of the electrode tip is larger than the width dimension of the opening such that the electrode tip overhangs and covers the opening, the electrode tip is a separate piece that is welded to the electrode base and/or the heat dissipating core;

the electrode tip includes a plurality of laser deposition layers that are formed on the electrode base and/or the heat dissipating core via an additive manufacturing process;

the opening is an annular opening, the core extension is an annular core extension that extends through the annular opening, and the electrode tip is an annular ring that is mated to the annular core extension;

the spark plug electrode is a ground electrode;

the spark plug electrode is a center electrode;

a spark plug, comprising: a shell; an insulator that is at least partially disposed within the shell; a center electrode that is at least partially disposed within the insulator; and the spark plug electrode of claim 1, wherein the spark plug electrode is a ground electrode that is attached to the shell; and the heat dissipating core further includes a core main body and a core extension, the core extension diverges from the core main body and extends at least partially into the opening, the tip extension of the electrode tip is directly thermally coupled to the core extension of the heat dissipating core through the opening.

According to yet another embodiment, there is provided a process for manufacturing a spark plug electrode that includes an electrode base with a side surface, a heat dissipating core at least partially located within the electrode base that includes a core main body and a core extension diverging from the core main body, and an electrode tip, the process comprises the steps of: forming an opening in the side surface of the electrode base, the opening extends through the electrode base and reaches the heat dissipating core; metal working the electrode base and the heat dissipating core such that at least some material from the heat dissipating core is pushed up into the opening and forms the core extension; and attaching the electrode tip to or forming the electrode tip on the side surface of the electrode base such that the electrode tip covers the opening, wherein the electrode tip is directly thermally coupled to the core extension of the heat dissipating core through the opening.

DRAWINGS

Preferred embodiments will hereinafter be described in conjunction with the appended drawings, wherein like designations denote like elements, and wherein:

FIG. 1 is a partial cross-sectional view of a first example of a spark plug having a ground electrode with an electrode tip that is directly thermally coupled to a heat dissipating core;

FIG. 2 is a cross-sectional view of the firing end of the spark plug in FIG. 1;

FIGS. 3-4 are cross-sectional views of a second example of a spark plug having a ground electrode with an electrode tip that is directly thermally coupled to a heat dissipating core;

DESCRIPTION

Figure 5:
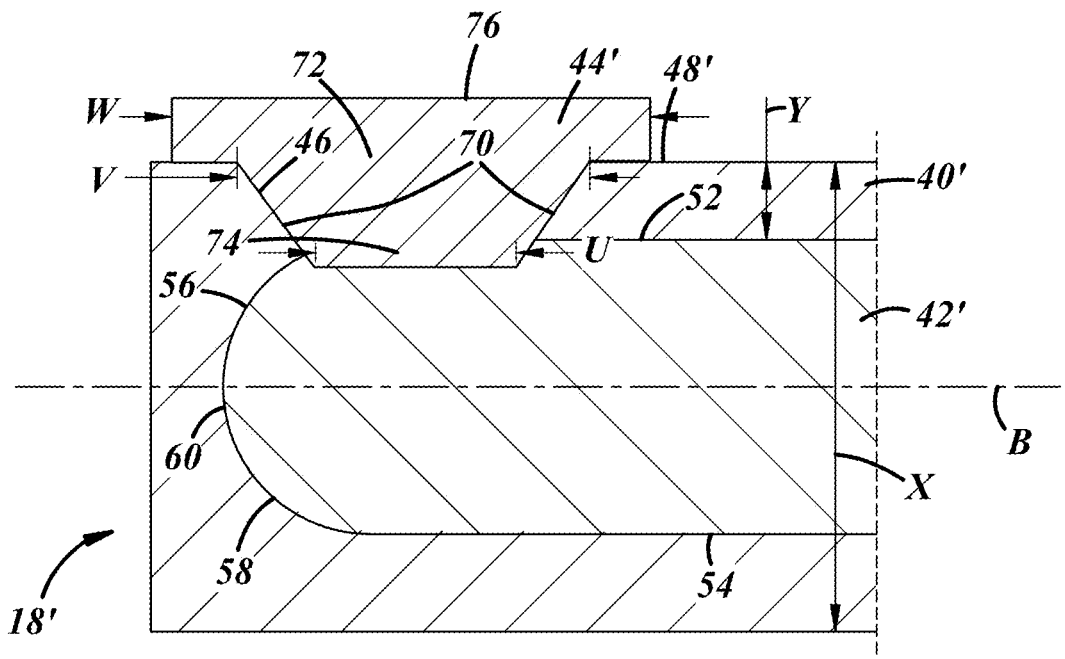
FIGS. 5-9 are enlarged cross-sectional views of different examples of ground electrodes that may be used with the spark plug in FIGS. 3-4, each of which has an electrode tip that is directly thermally coupled to a heat dissipating core.

The spark plug electrodes disclosed herein include an electrode tip that is attached to or formed on an electrode base so that the electrode tip is directly thermally coupled to a heat dissipating core through an opening in the electrode base. This direct thermal coupling of the electrode tip to the heat dissipating core takes place on a side surface of the electrode and helps dissipate or remove thermal energy away from the electrode tip in order to reduce thermal and/or other stresses in the electrode, particularly stresses at the joint that connects the electrode tip to the electrode base (e.g., stresses caused by differences in coefficients of thermal expansion, melting temperatures and/or other material properties). In one embodiment, the electrode tip is made from a precious metal-based material, the electrode base is made from a nickel-based material, and the heat dissipating core is made from a thermally conductive material such a copper-based material. The heat dissipating core may include a core main body and a core extension that diverges away from the core main body and extends at least partially into the opening in the electrode base so that the electrode tip can be directly thermally coupled to the core extension. The electrode tip can be attached to the electrode base via welding or, in the alternative, the electrode tip can be formed or built on the electrode base using a suitable additive manufacturing process, such as a powder bed fusion technique.

The spark plug electrodes disclosed herein may be used in a wide variety of spark plugs and other ignition devices including industrial spark plugs, automotive spark plugs, aviation igniters, glow plugs, or any other device that is used to ignite an air/fuel mixture in an engine or other piece of machinery. This includes, but is certainly not limited to, the exemplary industrial and automotive spark plugs that are shown in the drawings and are described below. Other embodiments and applications of the electrodes are also possible, such as various types of plugs with different axial, radial and/or semi-creeping spark gaps; prechamber, non-prechamber, shielded and/or non-shielded configurations; multiple center and/or ground electrode configurations; as well as plugs that burn or ignite gasoline, diesel, natural gas, hydrogen, propane, butane, etc. The electrodes and method of the present application are in no way limited to the illustrative examples shown and described herein. Unless otherwise specified, all percentages provided herein are in terms of weight percentage (wt %) and all references to axial, radial and circumferential directions are based on the center axis A of the spark plug.

Referring to FIGS. 1 and 2, there is shown an example of an industrial spark plug with a ground electrode having an electrode tip that is directly thermally coupled to a heat dissipating core within an electrode base for improved thermal management of the plug. The spark plug 10 includes a center electrode 12, an insulator 14, a metallic shell 16, and a ground electrode 18. The center electrode 12 is disposed within an axial bore of the insulator 14 and includes a firing end 20 that protrudes beyond a free end 22 of the insulator 14 and includes an optional electrode tip 24 made from a precious metal-based material. Insulator 14 is disposed within an axial bore of the metallic shell 16 and is constructed from a material, such as a ceramic material, that is sufficient to electrically insulate the center electrode 12 from the metallic shell 16. The free end 22 of the insulator 14 may be retracted within a free end 30 of the metallic shell 16, as shown, or it may protrude beyond the metallic shell 16. The metallic shell 16 includes threads 32 so that it can be screwed into an opening in a cylinder head, an axial bore 34 extending along the center axis A, as well as a number of other features well known in the art.

Ground electrode 18 is a bridge-type electrode, as opposed to a standard J-gap or other type of electrode, that extends across the entire axial bore 34 of shell 16 and is attached to the free end 30 of the shell at multiple locations (e.g., the ground electrode can be welded to the shell on both left- and right-hand sides of the plug, as illustrated). The ground electrode 18 may be in the shape of a bar or strip and includes an electrode base 40 made from a nickel-based material, a heat dissipating core 42 made from a copper-based material or some other thermally conductive material, and an electrode tip 44 made from a precious metal-based material. The electrode tip 44 may be in the form of a flat pad or disk that opposes a corresponding electrode tip 24 of the center electrode such that the electrode tips provide sparking surfaces for the emission, reception, and exchange of electrons across a spark gap G. The electrode tips 24, 44 may be formed from the same precious metal-based material or they may be formed from different precious metal-based materials. As is shown in the drawings and explained below in greater detail, the electrode base 40 has an opening on a side surface 48 that exposes the heat dissipating core 42, and the electrode tip 44 is attached to or formed on the side surface of the electrode base such that it covers the opening and enables the electrode tip to be directly thermally coupled to the heat dissipating core. Again, the embodiment in FIGS. 1 and 2 is only one example of the present spark plug electrode, as other examples, including that shown in FIGS. 3 and 4, are also possible.

In FIGS. 3 and 4, where similar reference numerals to FIGS. 1 and 2 denote similar features, there is shown another example of a ground electrode where an electrode tip is directly thermally coupled to a heat dissipating core, only in this example the spark plug is an automotive plug and the ground electrode has a standard J-gap configuration. Spark plug 10' has a center electrode 12', an insulator 14', a metallic shell 16', and a ground electrode 18'. Like the previous example, an optional electrode tip 24' made from a precious metal-based material may be added to the center electrode 12' such that it faces an opposing electrode tip 44' of the ground electrode 18' across a spark gap G. The center electrode 12', the insulator 14' and/or the metallic shell 16' may be similar or different to the corresponding components described above, as the present spark plug ground electrode is not limited to such features.

Ground electrode 18' is arranged according to a standard J-gap configuration and is attached to a free end 30' of the shell 16'. The ground electrode 18' may be in the shape of a bent bar or rod and includes an electrode base 40' made from a nickel-based material, a heat dissipating core 42' made from a copper-based material or some other thermally conductive material, and an electrode tip 44' made from a precious metal-based material. It is possible for the ground electrode 18' to be welded to the free end 30' of the shell 16' such that an end of the heat dissipating core 42' is directly thermally coupled to the shell for improved thermal conductivity, however, this is not required. The electrode tip 44' can be provided as a flat pad or disk, as well as any other suitable electrode tip shape, and is attached to a side surface 48' of the ground electrode 18'. As with the previous embodiment, the electrode base 40' has an opening on the side surface 48' that exposes the heat dissipating core 42', which is otherwise encased within the electrode base. The electrode tip 44' is attached to or formed on, depending on the manufacturing method, the side surface 48' of the electrode base 40' such that it covers the opening and allows the electrode tip to be directly thermally coupled to the heat dissipating core. This direct thermal coupling improves the transfer of thermal energy away from the electrode tip 44', through the heat dissipating core 42', and ultimately to the shell 16' and the surrounding engine and, thus, cools the electrode tip and reduces the thermal stress on the joint that connects the electrode tip to the electrode base.

It should be appreciated that the size, shape, location, orientation and/or composition of the electrode tip, the heat dissipating core and/or the electrode base may vary depending on the specific application in which they are used and such components are not limited to the illustrative examples shown herein. Furthermore, the electrode tip 44, 44' can be manufactured in a standard manner, cut to size, and then laser welded and/or otherwise attached to the side surface 48, 48' of the electrode base 40, 40' or, in the alternative, it can be formed or built onto the side surface of the electrode base layer-by-layer using an additive manufacturing process, such as a powder bed fusion technique. Some non-limiting examples of potential powder bed fusion techniques that may be used include: selective laser melting (SLM), selective laser sintering (SLS), direct metal laser sintering (DMLS), electron beam melting (EBM) and/or any other suitable 3D printing technique. Regardless of the specific manufacturing process that is used, the electrode tip 44, 44' may be attached to, connected to, formed on, built on and/or otherwise joined with the electrode base 40, 40' in such a way that the electrode tip covers an opening in the electrode base and is directly thermally coupled to the heat dissipating core 42, 42'. Other embodiments are possible as well.

Figure 6:
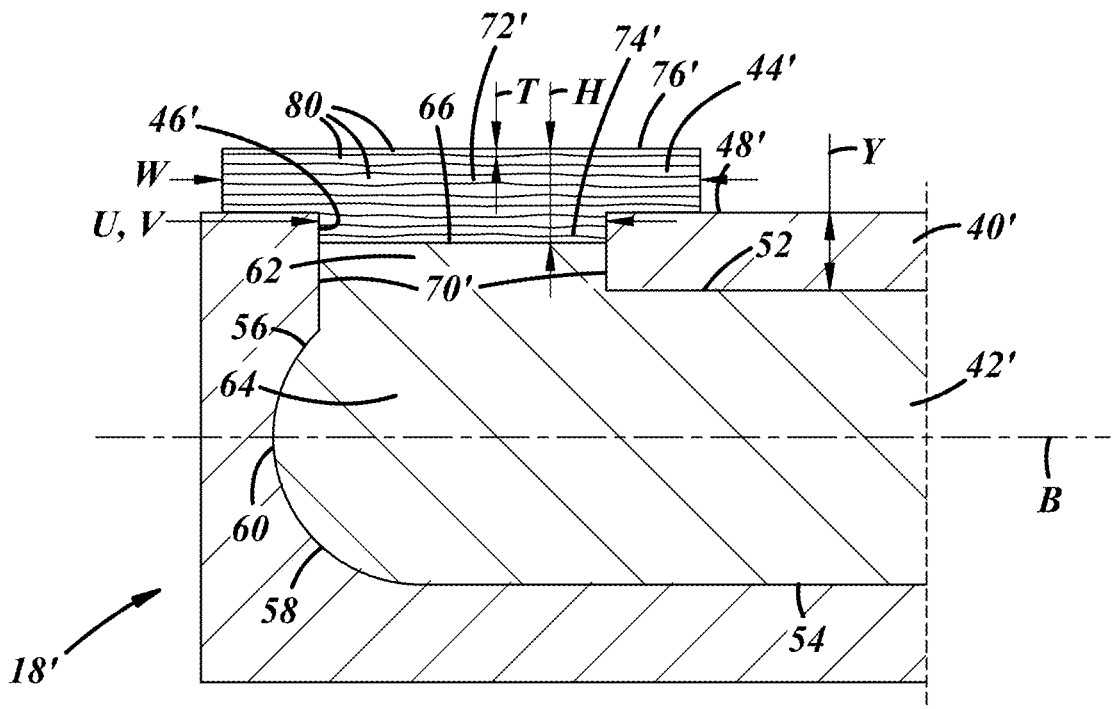
Figure 7:
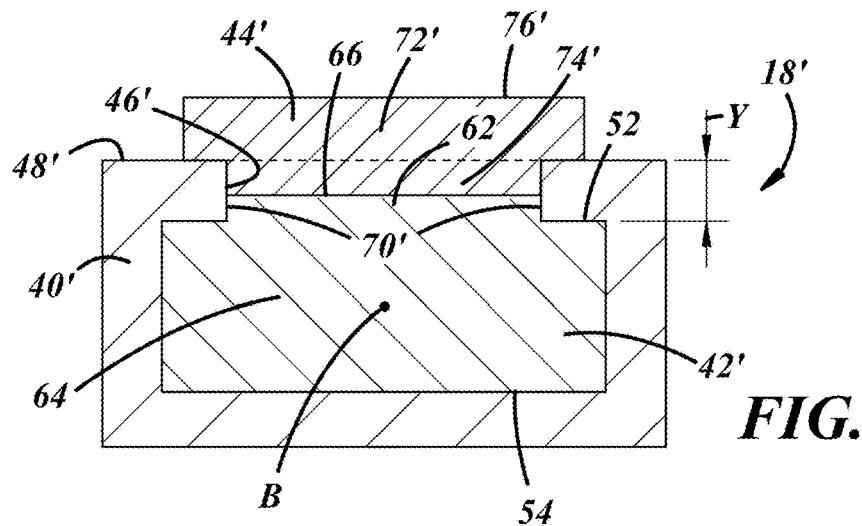
Figure 8:
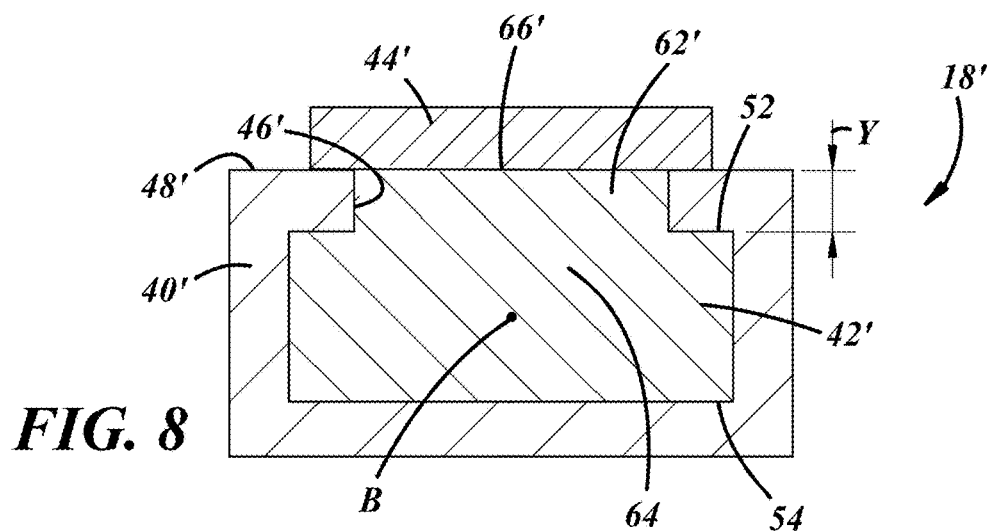
Figure 9:
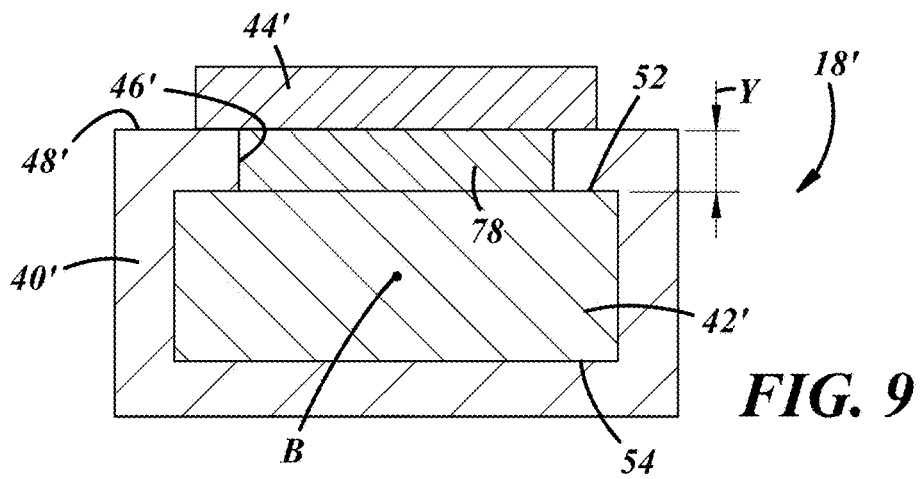
Figure 13:
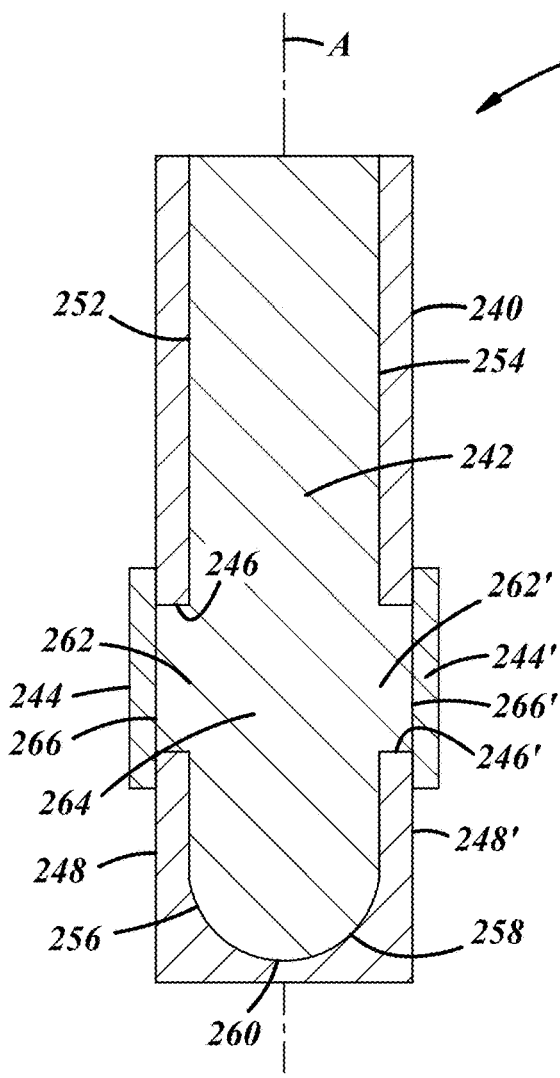
FIG. 13 is an enlarged cross-sectional view of a center electrode that has several electrode tips directly thermally coupled to a heat dissipating core.
Figure 14:
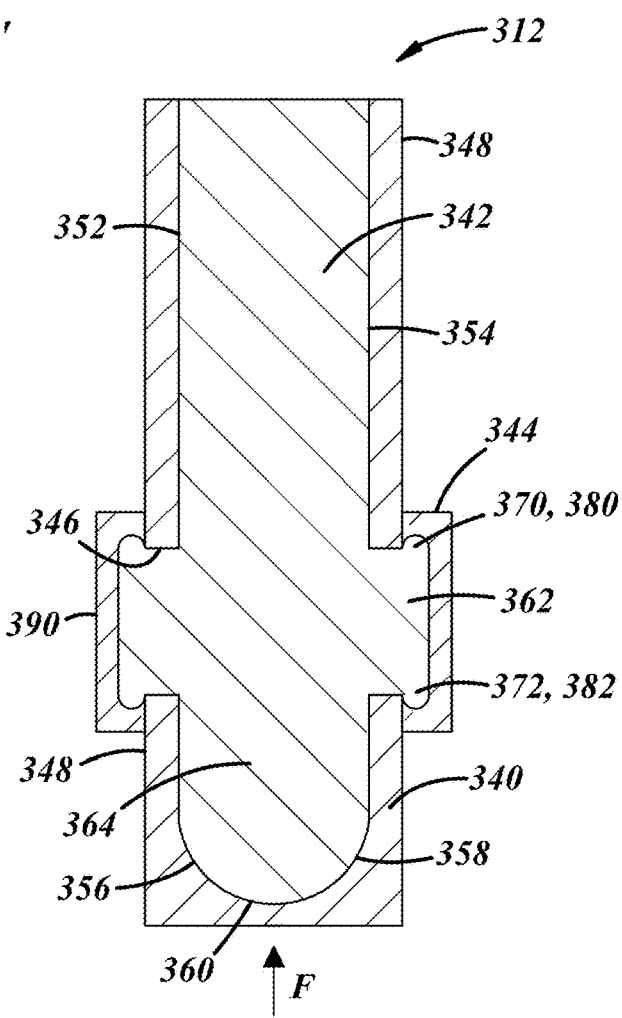
FIG. 14 is an enlarged cross-sectional view of a center electrode that has an annular electrode tip directly thermally coupled to a heat dissipating core.

Turning now to FIGS. 5-9, there are shown several enlarged schematic illustrations of ground electrodes where an electrode tip is directly thermally coupled to a heat dissipating core through an opening in an electrode base. These illustrations and the following descriptions coincide with spark plug 10' from FIGS. 3 and 4 (standard J-gap example), but they apply equally to spark plug 10 from FIGS. 1 and 2, as well as to any other suitable spark plug example. FIGS. 5 and 6 are cross-sectional views that are taken along a plane that is parallel to and includes a center axis B of the ground electrode (i.e., cross-sectional side views), whereas FIGS. 7-9 are cross-sectional views that are taken along a plane that is perpendicular to the center axis B (i.e., cross-sectional end views). In each case, a ground electrode 18' includes an electrode base 40', a heat dissipating core 42', and an electrode tip 44'; in some cases, the ground electrode also includes a thermal coupling piece that acts as a thermal conduit or connection between the electrode tip and the heat dissipating core such that the two components are directly thermally coupled to one another. Increasing the thermal communication between the electrode tip 44' and the heat dissipating core 42' enables the electrode tip to cool off more effectively during operation which, in turn, allows for a wider range of precious metal-based materials to be used in the electrode tip, including materials that are more cost effective. To explain, the electrical erosion rate and hence, the effective service life, of an electrode tip is impacted by several factors, including the melting point of the precious metal-based material. Iridium, with a melting point of about 2450° C., has a greater resistance to electrical erosion than platinum, with a melting point of about 1750° C. Electrode tips made from iridium-based materials typically display a more robust resistance to electrical erosion than those made from platinum-based materials and, thus, are sometimes more sought after. However, iridium can cost more, and in some instances, substantially more than platinum, so it may be desirable to minimize the amount of iridium and/or other high-cost materials in the production of the electrode tip. The present electrode, with an electrode tip 44' directly thermally coupled to a heat dissipating core 42' through an opening in the electrode base 40', keeps the electrode tip cooler and enables the use of a wider array of precious metal-based materials, including less expensive materials with lower melting points. It should be appreciated that the following descriptions of the electrode base, the electrode tip, and the heat dissipating core are not limited to the ground electrodes shown in the drawings and are also applicable to other center electrode and/or ground electrode embodiments. For instance, a center electrode having an electrode base made from a nickel-based material, an electrode tip made from a precious metal-based material, and a heat dissipating core (whether it be a single-material core or a multi-material core) made from one or more thermally conductive materials could be provided according to the present application, as shown in FIGS. 13 and 14. In such an arrangement, the electrode tip may be attached to or formed on a side surface of the center electrode base such that the electrode tip is directly thermally coupled to the heat dissipating core, as explained. This and other center and/or ground electrode embodiments are certainly within the scope of the present application.

Electrode base 40' at least partially surrounds the heat dissipating core and, thus, can act as an exterior casing or sheathing for the ground electrode and can also provide a surface on which the electrode tip can be attached or formed. The electrode base 40' includes an opening or hole 46, 46' in a side surface 48' that allows the electrode tip 44' to be directly thermally coupled to the heat dissipating core 42'. The electrode base 40' can be manufactured by drawing, extruding, machining, and/or using some other conventional process and may be made from a nickel-based material. The term "nickel-based material," as used herein, means a material in which nickel is the single largest constituent of the material by weight, and it may or may not contain other constituents (e.g., a nickel-based material can be pure nickel, nickel with some impurities, or a nickel-based alloy). According to one example, the electrode base 40' is made from a nickel-based material having a relatively high weight percentage of nickel, such as a nickel-based material comprising 98 wt % or more nickel. In a different example, the electrode base 40' is made from a nickel-based material having a lower weight percentage of nickel, like a nickel-based material comprising 50-90 wt % nickel (e.g., INCONEL' 600 or 601). One particularly suitable nickel-based material has about 70-80 wt % nickel, 10-20 wt % chromium, 5-10 wt % iron, as well as other elements in smaller quantities. For nickel-based materials, the electrode base 40' may have a coefficient of thermal expansion between $10\times10^{-6}$ m/mK and $15\times10^{-6}$ m/mK (measured at 100° C.), a melting temperature between 1,200° C. and 1,600° C., and a thermal conductivity between 10 W/m·K and 20 W/m·K (measured at 100° C.). The diameter or size of the electrode base 40' can vary substantially depending on the particular application and embodiment (e.g., the length of electrode base 40, which is a bridge-type electrode that extends across the entire axial bore of the shell, may be greater than the length of electrode base 40', which is a J-gap electrode that extends from one portion of a free end of the shell; also the size of an electrode base for an industrial plug is likely larger than that of one for an automotive plug). According to the non-limiting example shown in FIG. 5, which is a J-gap type ground electrode 18' for an automotive plug, the electrode base 40' may have a thickness X between 0.7 mm and 3.0 mm, inclusive, and even more preferably between 1.0 mm and 2.5 mm, inclusive. Other materials, including those that are not nickel-based, and other sizes and shapes may be used for the electrode base instead (e.g., the electrode base could have a cross-sectional shape that is circular, oval, square, rectangular or some other shape).

Heat dissipating core 42' is a section or portion of the ground electrode, usually an elongated interior portion extending along a length of the ground electrode (e.g., along center axis B), that is at least partially encompassed or surrounded by the electrode base and is designed to convey heat or thermal energy away from the firing end. The exact size, shape and location of the heat dissipating core 42' can vary by application. In the illustrated example of FIG. 5, which may be used with an electrode tip that is first manufactured separately and is then welded on, the heat dissipating core 42' has upper and lower elongated sides 52, 54 that generally extend in the lengthwise direction of the core, tapered sides 56, 58 that converge towards one another, and a terminal end 60 where the core terminates. The upper elongated side 52, and hence the heat dissipating core 42', is thermally coupled to the electrode tip 44' through the opening 46 in the electrode base 40', however, the heat dissipating core does not substantially protrude or extend into the opening. In the embodiment of FIG. 6, which may be used with an electrode tip that is built onto the electrode base via an additive manufacturing process (although this is certainly not required), the heat dissipating core 42' has upper and lower elongated sides 52, 54, tapered sides 56, 58, an axial end 60, as well as one or more core extensions 62 and a core main body 64. Sides 52, 54, 56, 58 and axial end 60 are similar to those described above, whereas core extension 62 diverges or branches off from the core main body such that it extends away from the upper elongated side 52 and into the opening 46'. In FIGS. 6 and 7, the core extension 62 extends partially or part way into the opening 46', but does not reach the side surface 48' (i.e., a contact surface 66 at the end of the core extension 62 is slightly recessed from the side surface 48'); in FIG. 8, the core extension 62' extends fully into the opening 46' and terminates at a contact surface 66' that is flush with the side surface 48'; in FIG. 9, there is no core extension protruding into the opening 46', as will be explained; and, according to another example (not shown), the core extension extends fully into and through the opening 46' such that a contact surface extends out of the opening and protrudes beyond the side surface 48'. It should be appreciated that the different heat dissipating core examples shown in FIGS. 5-9 may be used with each spark plug embodiment disclosed herein, as well as others. Also, the core extension 62, 62', which can be longer or shorter, narrower or wider, and may branch or extend from the core main body 64 in different directions than the illustrated example, can be produced during manufacturing of the ground electrode, as described below. It should also be recognized that the contact surface 66, 66' of the core extension 62, 62' do not necessarily have to be flat or planar, as illustrated. It is certainly possible for the contact surface 66, 66' to have a shape that is concave, convex, wavey, contoured, domed, peaked, jagged, angled and/or otherwise irregular in shape and, if so, the manufacturing process may include additional steps to flatten the contact surface out before the electrode tip is attached or formed thereon or even to flatten the contact surface out while the electrode tip is being added. In these examples, the upper elongated side 52, and hence the heat dissipating core 42', may be directly thermally coupled to the electrode tip 44' through the core extension 62, 62' which extends partially or fully into the opening 46'.

The heat dissipating core 42' is made from one or more thermally conductive materials, such as copper- or silver-based materials, having a greater thermal conductivity than that of the surrounding electrode base 40'. The thermally conductive material may have a thermal conductivity greater than 70 W/m·K (measured at 100° C.) and, even more preferably, a thermal conductivity greater than 200 W/m·K (measured at 100° C.). The term "copper-based material," as used herein, means a material in which copper is the single largest constituent of the material by weight, and it may or may not contain other constituents (e.g., a copper-based material can be pure copper, copper with some impurities, or a copper-based alloy). According to one example, the heat dissipating core 42' is made from a thermally conductive material that is a copper-based material having a relatively high weight percentage of copper, such as a copper-based material comprising 90 wt % or more copper. For copper-based materials, the heat dissipating core 42' may have a coefficient of thermal expansion between $14 \times 10^{-6}$ m/mK and $19 \times 10^{-6}$ m/mK (measured at 100° C.), a melting temperature between 950° C. and 1,200° C., and a thermal conductivity greater than 275 W/m·K (measured at 100° C.), however, other materials may be used as well.

The elongated sides 52, 54 extend in a lengthwise direction of the heat dissipating core 42', are generally parallel to one another when viewed in cross-section, and help form an outer boundary of the heat dissipating core. When the ground electrode 18' is manufactured by co-drawing or co-extruding the electrode base 40' with the heat dissipating core 42', the elongated sides 52, 54 are in close, intimate proximity with the adjacent electrode base material. It is typically undesirable for the heat dissipating core 42', which is made from material that is much less resistant to corrosion and/or erosion than precious metal-based material and is highly conductive, to be exposed on the outer surface of the electrode where it can become an unintended sparkover location. Thus, the heat dissipating core 42' is typically encompassed or covered in the area of the elongated sides 52, 54 with a sheath or casing of electrode base material having a thickness Y that is greater than or equal to 0.2 mm. This protects the heat dissipating core 42' from unintended sparking and electrical erosion and/or corrosion. In the present case, an opening 46, 46' has been created in the electrode base 40' that exposes the heat dissipating core 42', however, the opening is at least partially covered and/or filled with the electrode tip 44' which is made from a highly durable precious metal-based material. The opening 46 shown in FIG. 5 has tapered sidewalls 70 that open outwardly so that the opening is wider at the side surface 48' than it is at the upper elongated side 52; this can enable the volume within opening 46 to be more easily filled with the precious metal-based material that makes up the electrode tip. Opening 46' in FIGS. 6-9 has straight sidewalls 70' so that the opening has generally the same width at the side surface 48' as at the upper elongated side 52. Of course, the exact size, shape and orientation of openings 46, 46' can vary substantially from the examples illustrated in the drawings.

The heat dissipating core 42' typically does not terminate in a perfectly squared off form, but rather gradually narrows or tapers towards the terminal end 60. This can be due to design factors or to the manufacturing process, such as when the heat dissipating core is initially inserted into an electrode base cup and is then co-extruded or co-drawn with the electrode base. In some examples, the tapered sides 56, 58 are generally straight, angled segments that gradually converge towards one another, but it is also possible for the tapered sides to be rounded (e.g., as shown in FIGS. 5-6) or even more squared off. The terminal end 60 of the heat dissipating core 42' can have any number of different shapes and configurations, including ones that are pointed, rounded, tapered, blunted, squared-off, etc. In the examples of FIGS. 5 and 6, the openings 46, 46' in the electrode base material are located near, but slightly inward from the terminal end 60. In other examples, such as the one shown in FIGS. 1 and 2, the opening in the electrode base is located near the middle or center of the ground electrode 18 and, thus, is not located near a terminal end of the heat dissipating core 42.

Although the heat dissipating core 42' is shown in the drawings as a single-material core (i.e., a core formed from a single thermally conductive material, which may or may not include multiple constituents), it is also possible for it to be a multi-material core. According to a first example of a multi-material core, an inner heat dissipating core component (e.g., one made from a nickel-based material) extends along a portion of the electrode, and an outer heat dissipating core component (e.g., one made from a copper-based material) extends along the same portion of the electrode such that it at least partially surrounds and is concentric with the inner heat dissipating core component. In this concentric or layered arrangement, it is possible for the inner heat dissipating core component to extend or protrude beyond the end of the outer heat dissipating core component. According to a second example of a multi-material core, a forward heat dissipating core component extends along a portion of the electrode that is closer to a firing end, and a rearward heat dissipating core component extends along a portion of the electrode that is further from the firing end. In this end-to-end or serial arrangement, one of the heat dissipating core components may be longer than the other. The first and/or second multi-material core examples may be used with a center electrode and/or a ground electrode. Of course, numerous other heat dissipating core arrangements and configurations are possible and are certainly within the scope of the present application.

Electrode tip 44' is the section or portion of the electrode, usually the sparking portion, that is attached to or formed on the electrode base, such as by welding or additive manufacturing. The electrode tip 44' may be made from a precious metal-based material so as to provide improved resistance to corrosion and/or erosion. The term "precious metal-based material," as used herein, means a material in which a precious metal is the single largest constituent of the material by weight, and it may or may not contain other constituents (e.g., a precious metal-based material can be pure precious metal, precious metal with some impurities, or a precious metal-based alloy). Precious metal-based materials that may be used include iridium-, platinum-, ruthenium-palladium- and/or rhodium-based materials, to cite a few possibilities. According to one example, the electrode tip 44' is made from an iridium-, platinum- or ruthenium-based material, where the material has been processed into a solid form or a powder form so that it can be used in the additive manufacturing process, like powder bed fusion. For iridium-based materials, the electrode tip may have a coefficient of thermal expansion between $6 \times 10^{-6}$ m/mK and $7 \times 10^{-6}$ m/mK (measured at 100° C.), a melting temperature between 2,300° C. and 2,500° C., and a thermal conductivity between 120 W/m·K and 180 W/m·K (measured at 100° C.); for platinum-based materials, the electrode tip may have a coefficient of thermal expansion of between $8 \times 10^{-6}$ m/mK and $10 \times 10^{-6}$ m/mK (measured at 100° C.), a melting temperature between 1,650° C. and 1,850° C., and a thermal conductivity between 50 W/m·K and 90 W/m·K (measured at 100° C.). As mentioned above, certain precious metals, like iridium, can be very expensive, thus, it is typically desirable to reduce the content of such materials in the electrode tip, so long as doing so does not unacceptably degrade the performance of the electrode tip. Precious metal-based powders with no more than 60 wt % iridium (e.g., Pt—Ir40, Pt—Ir50, Ir—Pt40, Ru—Rh5, etc.), and preferably with no more than 50 wt % iridium (e.g., Pt—Ir40, Pt—Ir50, Ru—Rh5, etc.), can be used to make the electrode tip 44' when the tip is directly thermally coupled to the heat dissipating core 42', as such materials can strike a desirable balance between cost and performance. However, other precious-metal based powders, such as those with up to about 98 wt % iridium (e.g., Ir—Rh2.5, Ir—Rh5, Ir—Rh10, Ir—Pt5, Ir-Pt5-Rh5), etc.), may be used as well, particularly if the prices of such materials come down in the future.

The diameter or size of the electrode tip 44' varies depending on the particular application and embodiment, but it is configured to cover the opening 46, 46' in the side surface 48' of the electrode base 40'. In each of the examples in FIGS. 5-9, the electrode tip 44' has a width dimension W, the opening 46, 46' has a width dimension V (which is measured at the top of the opening if the width of the opening varies), and the width dimension W of the electrode tip 44' is larger than the width dimension V of the opening 46, 46' such that the electrode tip overhangs and covers the opening. Covering the opening 46, 46' with the electrode tip 44' ensures that no portions of the heat dissipating core 42' are exposed to the spark gap where they could inadvertently become an unintended sparking site. According to the embodiments shown in FIGS. 5-7, the electrode tip 44' includes a tip main body 72, 72', a tip extension 74, 74' and a tip sparking surface 76, 76'. As its name suggests, the tip main body 72, 72' constitutes the main portion or segment of the electrode tip, the tip extension 74, 74' is located on a bottom or under side of the tip main body 72, 72' and extends therefrom, and the tip sparking surface 76, 76' is located on a top or upper side of the tip main body 72, 72'. The tip extension 74, 74' and the tip sparking surface 76, 76' may be located on opposing sides of the tip main body 72, 72'. The tip extension 74 in FIG. 5 has tapered or inclined sidewalls in order to fit the tapered sidewalls 70 of opening 46, whereas the tip extension 74' in FIGS. 6-7 has straight sidewalls in order to complement the straight sidewalls 70' of opening 46'. In both cases, the tip extension 74, 74' extends from the tip main body 72, 72' at least partially into opening 46, 46' such that it contacts and is directly thermally coupled to a portion of the heat dissipating core 42'; in FIG. 5 the tip extension 74 contacts an upper side of the heat dissipating core, and in FIGS. 6-7 the tip extension 74' contacts a core extension 62. The width dimension W of the tip main body 72, 72' may be larger than a width dimension U of the tip extension 74, 74' (which is measured at the bottom or distal end of the tip extension if the width of the tip extension varies) and a width dimension V of the opening. Having a tip main body 72, 72' that is larger than a tip extension 74, 74' in at least one width dimension gives the electrode tip 44' somewhat of a rivet or mushroom shape such that the electrode tip can overhang and cover the opening. The electrode tip does not have to include a circular cross-section with a "diameter," but instead could include an oval, square, rectangular or other cross-section with a "dimension." The electrode tip may be produced in the shape of rivets, cylinders, bars, columns, wires, balls, mounds, cones, flat pads, disks, plates, rings, sleeves, etc., and may be circular, oval, square, rectangular and/or other shaped, to cite a few possibilities.

As mentioned above, the electrode tip 44' may be attached to the electrode base 40' via welding or, in the alternative, the electrode tip may be formed or built on the electrode base via additive manufacturing, such as by using a powder bed fusion technique. According to those examples where the electrode tip 44' is attached by welding, the electrode tip is first manufactured separately (e.g., an elongated wire or column could be made by powder metallurgy, extrusion, drawing, etc. and then cut into circular or other flat pieces), and is then welded or otherwise attached to the side surface 48' of the ground electrode base 40'. Non-limiting examples of potential welding techniques include laser welding, electron beam welding, resistance welding, etc. Turning to FIG. 5, there is shown an example of an electrode tip 44' that may be attached to an electrode base 40' via welding. In the welding example, the electrode tip 44' may simply be a flat piece or it may be provided with a tip extension 74 on its underside that extends into the opening 46, as already explained. When the electrode tip 44' is welded to the electrode base 40', the thermal energy from the welding process can melt together portions of the electrode tip and the heat dissipating core (as well as portions of the electrode base), particularly if the electrode tip is being forced, urged or pushed into the opening 46 while it is being welded. In other embodiments, the tip extension 74 or just the bottom of the electrode tip 44' contacts the heat dissipating core 42' such that they are in physical and thermal communication with each other, without the different materials having been melted and joined together. In both of these examples—i.e., where material from the electrode tip and the heat dissipating core have melted and joined together and where the electrode tip simply contacts the heat dissipating core—the electrode tip is directly thermally coupled to the heat dissipating core. In FIG. 9, a thin flat piece of thermally conductive material (e.g., a copper-based material), which is separate from the heat dissipating core, has been inserted into the opening 46' in between the heat dissipating core 42' and the electrode tip 44' and acts as a thermal coupling piece 78 for directly thermally coupling the electrode tip to the heat dissipating core. FIGS. 5-9 all show different examples where an electrode tip is directly thermally coupled to a heat dissipating core with or without a thermal coupling piece 78.

According to those examples where the electrode tip 44' is formed or built by additive manufacturing, the electrode tip may be made from a bed of precious metal-based powder that fills or covers the opening 46, 46' so that, when irradiated by a laser or electron beam, the precious metal-based powder and some of the solid material of the electrode base 40' and/or the heat dissipating core 42' are melted and solidify into laser deposition layers. As illustrated in FIG. 6, the process of creating individual layers is repeated, thereby creating a number of laser deposition layers 80 that are sequentially built or stacked on one another such that the layers are parallel to the adjacent side surface 48' of the ground electrode (being "parallel" in this context does not require perfect parallelism, so long as layers 80 are, when viewed in cross-section, parallel to the adjacent side surface 48' within a tolerable margin of error). Some of the laser deposition layers 80 may have materials from the heat dissipating core 42', the electrode base 40' and the electrode tip 44'; some layers 80 may only have material from the electrode base 40' and the electrode tip 44'; some layers 80 may only have material from the heat dissipating core 42' and the electrode tip 44'; while other layers 80 may only have material from the electrode tip 44'. Each laser deposition layer has an average layer thickness T, which may be between 5 µm and 60 µm, and the total or sum of all of the layer thicknesses is the electrode tip height H, which may be between 0.05 and 3.0 mm, or even more preferably between 0.1 and 1.5 mm.

Figure 10:
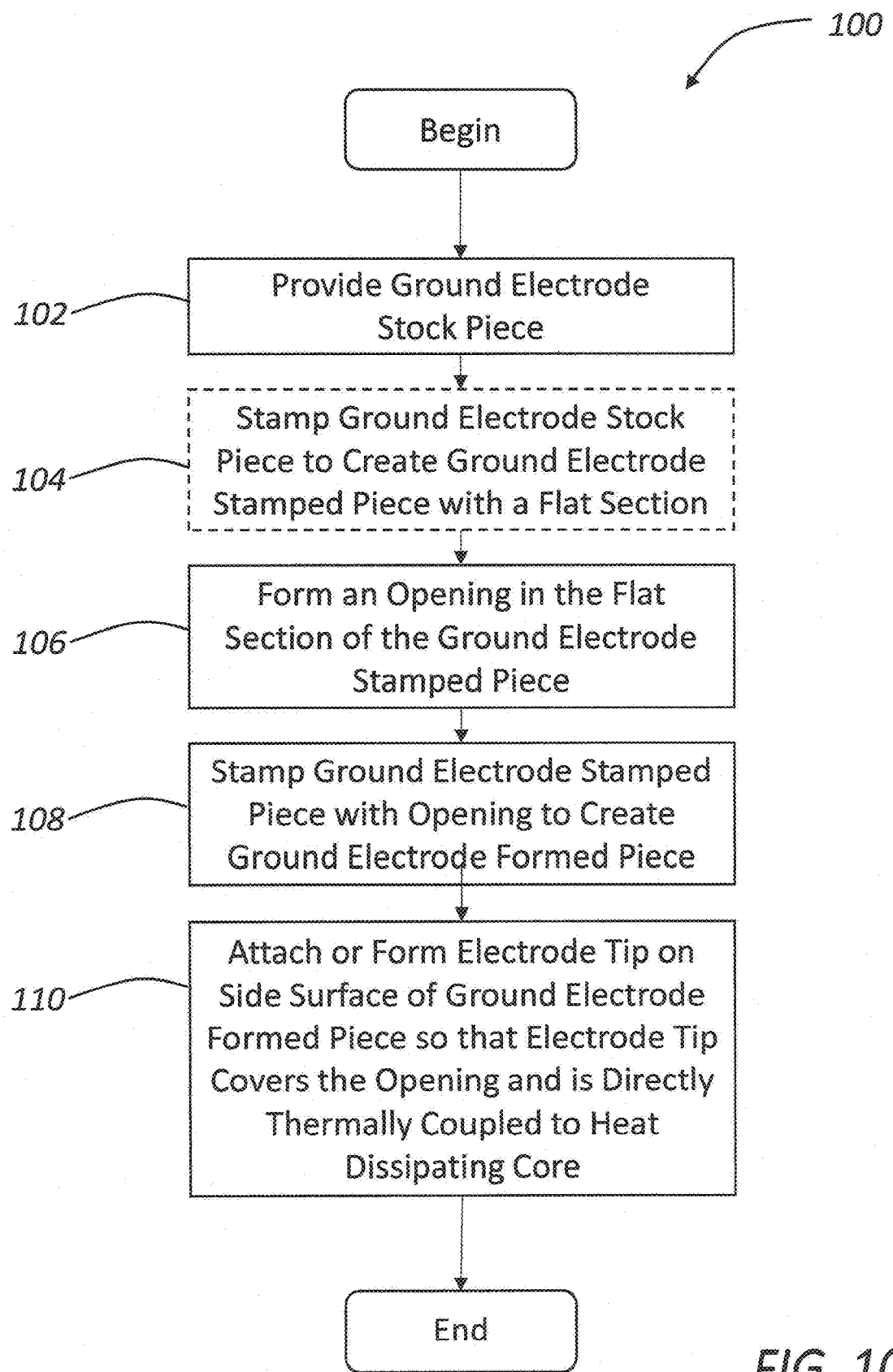
FIG. 10 is a flowchart of a process for manufacturing a spark plug ground electrode that may be used with the various ground electrode examples shown in FIGS. 1-9 in order to attach or form an electrode tip on an electrode base such that the electrode tip is directly thermally coupled to a heat dissipating core.
Figure 11:
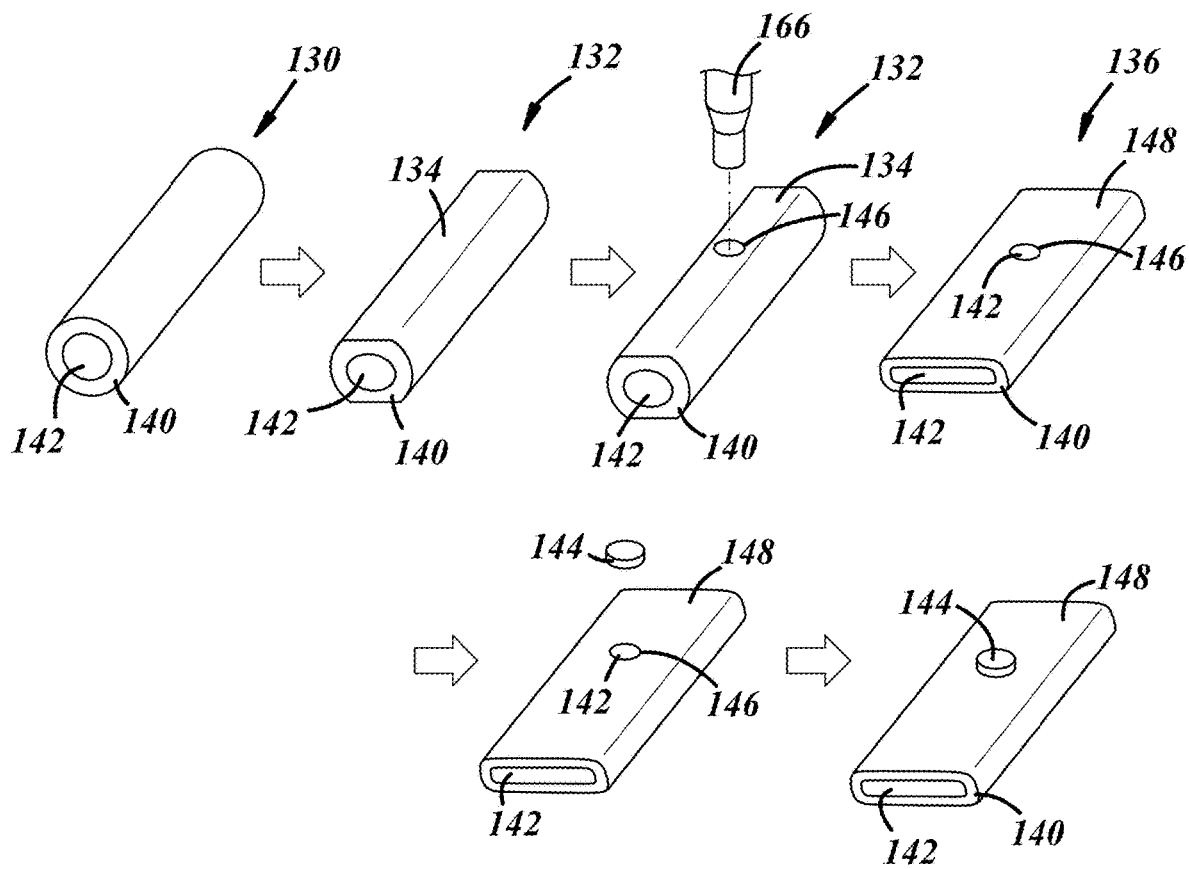
FIG. 11 is a schematic view of an example of a spark plug ground electrode at different stages of manufacturing that coincide with the manufacturing process of FIG. 10.
Figure 12:
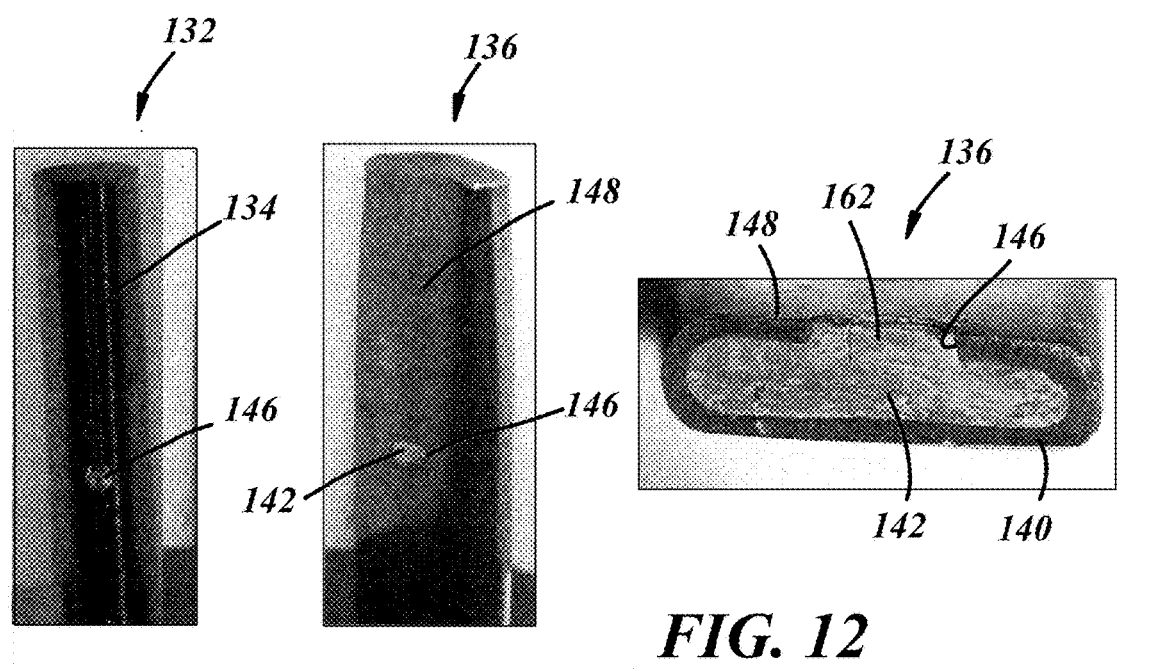
FIG. 12 are photographs of the spark plug ground electrode from FIG. 11 at different stages of manufacturing that coincide with the manufacturing process of FIG. 10.

Turning now to FIGS. 10-12, there is shown a first example of a method 100 for manufacturing a ground electrode with an electrode tip that is directly thermally coupled to a heat dissipating core through an opening in an electrode base, such as the various ground electrodes 18, 18' disclosed herein. Starting with step 102, a ground electrode stock piece 130 is provided with an electrode base 140 surrounding or encompassing a heat dissipating core 142. The ground electrode stock piece 130 may be provided in wire form such that it is elongated and has a round cross-sectional shape, as shown. In a different example, the ground electrode stock piece 130 is provided with a rectangular, square or other cross-sectional shape that has one or more flat surfaces. The electrode base 140 and the heat dissipating core 142 can be the same electrode base and heat dissipating core previously described or they can be different.

Next, the ground electrode stock piece 130 is stamped, embossed, flattened and/or otherwise formed into a ground electrode stamped piece 132 with one or more flat section(s) 134 on a side surface, step 104. This step is optional in that, if the ground electrode stock piece 130 was initially provided with one or more flat section(s) in step 102, then this step may be skipped. It is possible for step 104 to stamp or flatten the piece in such a manner that the flat section(s) 134 extend the entire axial length of the side surface or the flat section(s) can be localized just in the area where an electrode tip is to be joined, as will be explained. According to one example, step 104 only partially stamps or flattens the electrode piece, as a subsequent stamping step is used to give the electrode piece its final cross-sectional shape. Step 104 will likely cause the cross-sectional shape of both the electrode base 140 and the heat dissipating core 142 to deform such that they become somewhat oblong, as shown.

An opening or hole 146 is then formed in the flat section 134 of the ground electrode stamped piece 132, step 106. The opening 146 may be formed by drilling, milling, machining, cutting and/or any other suitable technique for creating an opening or hole in a piece of metal (e.g., by using a milling cutter 166). Skilled artisans will appreciate that forming the opening 146 in a flat section 134 is preferable to forming an opening in a rounded or contoured surface, as the flat section helps keep the walls of the opening straighter and more precise and repeatable across many parts. The location and size of the opening 146 is determined based on the desired location and size of the electrode tip 144 that is to be added. Step 106 preferably creates an opening 146 in a side surface of the electrode base 140 that extends through the electrode base and reaches the heat dissipating core 142 (e.g., the depth of the opening or hole 146 is approximately equal to the electrode base thickness Y in the area of the opening). In this sense, opening 146 is a blind hole in that it does not extend completely through the ground electrode stamped piece 132, but rather stops at or near the heat dissipating core 142. In FIG. 12, there is shown a photo of a non-limiting example of a ground electrode stamped piece 132 with an opening 146 on a flat section 134.

Next, the ground electrode stamped piece 132 with its opening 146 is further stamped, embossed, flattened and/or otherwise metal worked into a ground electrode formed piece 136, step 108. This step may accomplish several objectives: first, it further flattens out the electrode piece so that it takes on its final, desired cross-sectional form; and second, it pushes or squeezes some of the material from the heat dissipating core 142 up into the opening 146. In terms of the first objective, the ground electrode formed piece 136 with its flat side surface 148 is now ready to receive an electrode tip, after which it can be bent, cut to length and/or attached to the shell (side surface 148 will eventually face the spark gap G when the spark plug is fully assembled, similar to side surface 48'). As for the second objective, the material from the heat dissipating core 142 has been pushed or squeezed up into the opening 146 (this material corresponds to the core extensions 62, 62' previously described) such that it is generally flush with the adjacent side surface 148, which is made from electrode base material 140. This creates a continuous flat surface across side surface 148, including across the opening 146 where the heat dissipating core material 142 is exposed, which helps for directly thermally coupling the electrode tip to the core. According to another example of step 108, the heat dissipating core material is not pushed or squeezed to the point where a core extension is flush with the adjacent side surface 148, but is recessed somewhat from the side surface. It is also possible for the heat dissipating core material to be pushed or squeezed so much that a core extension actually extends beyond the adjacent side surface and, thus, slightly protrudes out of the opening. In FIG. 12, there is shown several photos of a non-limiting example of a ground electrode formed piece 136 where the heat dissipating core material 142 has been pushed up into the opening 146 such that a core extension 162 is flush with the adjacent side surface 148 which is made of electrode base material 140.

An electrode tip is then attached to or formed on the side surface such that the electrode tip covers the opening and is directly thermally coupled to the heat dissipating core, step 110. As explained above, the electrode tip can be attached to the side surface of the ground electrode via a welding technique or the like or, in the alternative, the electrode tip can be formed or built on the side surface using an additive manufacturing process, such as a powder bed fusion or some other 3D printing technique. In the case of attachment, an electrode tip 144 in the shape of a columnar piece, a flat pad or puck, a rivet, a spherical piece, etc. is positioned on the side surface such that it covers the opening 146 and is then welded in place. Depending on the shape, size and/or composition of the electrode tip 144 and/or the opening 146, step 110 may weld the electrode tip in place with a circumferential laser weld that goes around the outer periphery of the electrode tip where it meets the side surface, a whole area laser weld that goes across the top of the electrode tip, or a suitable resistance weld of some type, to cite just a few possibilities. It is preferable that the electrode tip 144 completely cover the opening 146 so that none of the heat dissipating core material is exposed to the sparking area (i.e., the outer diameter or dimension of the electrode tip may be greater than the corresponding diameter or dimension of the opening). In this case, the electrode tip 144 will extend beyond the borders of the opening, even if just slightly, such that the electrode tip can be attached to the side surface 148 of the electrode base 140. So long as the electrode tip contacts and is joined to some portion of the side surface of the electrode base, even if the majority of the attachment or interface is between the electrode tip and the heat dissipating core (as shown in FIGS. 5-9), this constitutes the electrode tip being attached to the side surface. It is also possible for the electrode tip 144 to have an outer diameter that is equal to or slightly smaller than an inner diameter of the opening 146 such that the electrode tip is inserted into the opening and does not rest on the side surface 148. In this example, a circumferential weld or the like could be used to attach the electrode tip to the side surface such that the electrode tip "covers" the opening, even though the electrode tip does not completely cover the opening with an overhanging outer diameter that extends beyond the inner diameter of the opening. Once step 110 is complete, the electrode tip 144 is directly thermally coupled to the heat dissipating core 142 through the opening 146. As mentioned above, it is also possible for a thermal coupling piece to first be inserted into the opening 146 and then for the electrode tip 144 to be attached to the side surface 148, as illustrated in FIG. 9.

In the case of forming the electrode tip on the side surface, an additive manufacturing process (sometimes referred to as a 3D printing process) may be used to form or build the electrode tip, one layer at a time, on the side surface, step 110. This process may include the following sub-steps: i) securing the ground electrode formed piece 136 within a tool or jig (e.g., one having a build plate) such that the side surface 148 with its opening 146 is facing upwardly; ii) covering the side surface 148 and the opening 146 with a thin powder bed layer that includes a precious metal-based material; iii) using a laser or electron beam to melt the thin powder bed layer in the area of the electrode tip footprint (this creates an initial laser deposition layer); iv) covering the side surface 148, including the initial/previous laser deposition layer, with another thin powder bed layer; v) using the laser or electron beam to melt the new powder bed layer in the area of the electrode tip footprint, and vi) repeating steps iv)-v) for as many cycles as needed in order to build the electrode tip, layer by layer, to its desired height H. In the initial laser deposition layer, the precious metal-based powder may be melted into the heat dissipating core material 142 that is exposed through the opening 146. In subsequent laser deposition layers, the precious metal-based powder may be melted into previous laser deposition layer(s), as well as possibly into the heat dissipating core material. On a last pass through sub-step vi), the method forms a final laser deposition layer, which is at least part of a sparking surface of the electrode tip. The laser deposition layers will extend beyond the borders of the opening, even if just slightly, such that the electrode tip completely covers the opening 146. So long as at least one laser deposition layer of the electrode tip contacts and is joined to some portion of the side surface 148 of the electrode base 140, even if the majority of the attachment or interface is between the laser deposition layers and the heat dissipating core (as shown in FIGS. 5-9), this constitutes the electrode tip being formed or built on the side surface. One feature of the electrode tip which is formed or built according to an additive manufacturing process is that the electrode tip may be securely fastened to the electrode base without the use of a weld (i.e., the ground electrode has a weldless joint between the electrode tip and base), which can be advantageous for a number of reasons, including those described above. Of course, the preceding description is only one example of an additive manufacturing process that may be used, as other such processes are certainly possible. It is possible for the composition of the noble metal-based material to be the same for all of the layers, or the composition may change layer by layer or every so many layers in order to help crate an electrode tip with a gradient type composition along its axial height.

According to a different embodiment of the manufacturing method, step 110 may insert and secure an electrode tip in the form of a columnar pin or post into the opening in the electrode base. The outer diameter or dimension of the columnar pin may be slightly smaller than the inner diameter or dimension of the opening so that it can be easily inserted into the opening, instead of being larger than the opening and overhanging it, or the columnar pin can be sized to produce a form fit in the opening (e.g., by crimping or embossing). The columnar pin may be made of a single, homogeneous material (e.g., an electrode tip made from a precious metal-based material), or it can be made from several different pieces made from different materials (e.g., a first thermal coupling piece at the bottom of the columnar pin so that it contacts the heat dissipating core, and a second electrode tip piece made from a precious metal-based material). In yet a different embodiment, step 110 may position a ball or sphere made from a precious metal-based material (e.g., a platinum-based material) on the opening in the electrode base, and then resistance weld the ball in place such that the resulting electrode tip is directly thermally coupled to the heat dissipating core through the opening. Other embodiments are certainly possible.

Skilled artisans will appreciate that the process just described may be used to manufacture large numbers of electrodes at a time (i.e., batch processing), as well as various types of electrodes that differ from those shown here.

While the previous embodiments have been directed to spark plug ground electrodes, it is also possible to apply features disclosed herein to certain spark plug center electrodes, particularly center electrodes designed for use with radial or side spark gaps. With reference to FIG. 13, there is shown another embodiment where a spark plug center electrode 212 includes an electrode base 240, a heat dissipating core 242, and a pair of electrode tips 244, 244' that are arranged to form radial or side spark gaps with corresponding ground electrodes. The electrode tips 244, 244' are directly thermally coupled to the heat dissipating core 242 in order to remove heat from the firing end of the center electrode, as already explained. The electrode base 240 may be made from a nickel-based material and may include any combination of electrode base features described above; the heat dissipating core 242 may be made from a thermally conductive material like a copper-based material and may include any combination of heat dissipating core features described above; and the electrode tips 244, 244' may be made from a precious metal-based material, like iridium- and platinum-based materials, and may include any combination of electrode tip features described above.

Electrode base 240 acts as a sheathing or skin for the electrode, as already described, and may include one or more openings 246, 246' that provide the corresponding electrode tips 244, 244' with direct thermal access to the heat dissipating core 242. Skilled artisans will appreciate that the positioning of the openings 246, 246' and the attached electrode tips 244, 244' on side surfaces 248, 248' of the center electrode are for radial or side spark gaps where ground electrodes come in and oppose the center electrode from the sides, as opposed to axial spark gaps where a ground electrode opposes the axial end of the center electrode.

Heat dissipating core 242 extends along the interior of the center electrode and is at least partially encompassed or surrounded by the electrode base 240. The heat dissipating core 242 is designed to convey heat away from the firing end and includes elongated sides 252, 254, tapered sides 256, 258, a terminal end 260, core extensions 262, 262', and a core main body 264. According to this embodiment, electrode tip 244 is directly thermally coupled to the core extension 262, and hence the heat dissipating core, through the opening 246, and electrode tip 244' is directly thermally coupled to the core extension 262' through the opening 246'. As with the previous embodiments, each of the core extensions 262, 262' may extend partially or part way into its corresponding opening 246, 246' such that a contact surface 266, 266' of the core extension does not reach a side surface 248, 248' of the electrode base; each of the core extensions may extend fully into a corresponding opening such that a contact surface of the core extension is flush with a corresponding side surface (shown in FIG. 13); or each of the core extensions may extend fully into and through a corresponding opening such that a contact surface protrudes beyond a corresponding side surface. It is also possible for heat dissipating core 242 to have no core extensions extending into openings 246, 246', in which case, the electrode tips 244, 244' could be in the shape of a mushroom or rivet and have tip extensions that protrude through the openings and contact the elongated sides 252, 254 of the heat dissipating core (similar to FIG. 5).

In a different example, the center electrode 212 could only have one electrode tip 244 (and hence, only one opening 246 and one core extension 262), instead of multiple electrode tips. In yet a different example, the center electrode 212 could include more than two electrode tips attached on side surfaces of the center electrode (e.g., a number of electrode tips could be circumferentially spaced from one another around the side surface, and/or a number of electrode tips could be located at different axial positions of the side surface). Numerous other embodiments are possible for use with a center electrode, including the various examples already described herein (e.g., examples where: the electrode tip is a separate piece that is welded onto the electrode base or is formed or built onto the side surface with additive manufacturing, the electrode tip is directly thermally coupled to the heat dissipating core with a thermal coupling piece or without a thermal coupling piece, etc.). Furthermore, the manufacturing method described above could generally be used to produce the center electrode embodiment of FIG. 13. In one possible embodiment for manufacturing the center electrode 212, both openings 246, 246' could be drilled or machined at the same time, before the heat dissipating core 242 is inserted into the electrode base 240.

Turning now to FIG. 14, there is shown another example of a spark plug center electrode 312 that has an electrode base 340, a heat dissipating core 342, and an electrode tip 344, where the electrode tip helps form radial or side spark gaps with one or more corresponding ground electrodes and is directly thermally coupled to the heat dissipating core. The electrode base 340 may be made from a nickel-based material and may include any combination of electrode base features described above; the heat dissipating core 342 may be made from a thermally conductive material like a copper-based material and may include any combination of heat dissipating core features described above; and the electrode tip 344 may be made from a precious metal-based material, like iridium- and platinum-based materials, and may include any combination of electrode tip features described above.

Electrode base 340 may include one or more openings 346 that provide the corresponding electrode tip 344 with direct thermal access to the heat dissipating core 342. One potential difference between opening 346 and the openings of the previous embodiments is that opening 346 may extend completely circumferentially around the center electrode 312 such that it acts as an annular grove or channel in the electrode base 340. This is not necessary, however, as the opening 346 could instead include a series of separate or discrete openings that are circumferentially spaced around the center electrode. Other embodiments are possible as well.

Heat dissipating core 342 is located in the interior of the center electrode and is at least partially encompassed or surrounded by the electrode base 340. The heat dissipating core 342 includes elongated sides 352, 354, tapered sides 356, 358, a terminal end 360, one or more core extensions 362, and a core main body 364. According to this embodiment, opening 346 is an annular opening or grove that circumferentially extends around the entire center electrode, core extension 362 is an annular extension or rib that also circumferentially extends around the entire center electrode and extends through the annular opening 346, and electrode tip 344 is an annular tip or ring that also circumferentially extends around the entire center electrode and is in direct thermal contact with the core extension 362. The core extension 362 diverges or branches away from the core main body 364. It is possible for core extension 362 to simply extend through the opening 346 and contact an inner surface of the electrode tip 344, as shown in FIG. 13, or the core extension may extend through the opening 346 and have one or more extension tabs or ears 370, 372 that expand outward to fill in corresponding interior lobes or undercuts 380, 382 of the electrode tip, as shown in FIG. 14. The extension tabs 370, 372 can help form a mechanical interlock or positive lock between the heat dissipating core 342 and the electrode tip 344 such that the electrode tip may or may not need to be further welded into place. The exact size, shape and/or number of extension tabs 370, 372 can vary from that shown in the drawings.

Electrode tip 344 is preferably an annular tip that is made from a precious metal-based material and circumferentially extends around the center electrode 312. In different embodiments, the electrode tip 344 may include a number of smaller tip pieces that are circumferentially spaced around the center electrode, as opposed to a single annular piece. The electrode tip 344 may have a generally C-shaped cross-section with a sparking surface 390 on its exterior and lobes or undercuts 380, 382 on its interior. Due to the nature of this shape with its undercuts 380, 382 and the difficulty of metal working certain precious metals, the electrode tip 344 may be formed using an additive manufacturing process or some other advanced manufacturing process. It is possible for the electrode tip 344 to be laser welded or otherwise attached to the electrode base 340 using one or more circumferential welds (not shown), although this is not necessary.

A manufacturing process similar to that described above may be used to create center electrode 312. In such a process, the electrode base 340 and the heat dissipating core 342 could be co-extruded, co-drawn and/or otherwise formed into an elongated electrode shape, as is widely known in the art. Next, the electrode base 340 could be removed in the area of opening 346 such that the opening or groove completely circumferentially surrounds the center electrode; at this point, the core extension 362 would not be formed yet such that the exposed surface of the heat dissipating core 342 in the area of the opening 346 would still be aligned with elongated sides 352, 354. The electrode tip 344, which may be produced using an additive manufacturing technique, could then be positioned on the center electrode 312 so that it circumferentially covers and overhangs the opening 346. It may be preferable to temporarily hold the electrode tip 344 in place with a tack weld or the like, but this is not mandatory. Once the electrode tip 344 is in position, a force F can be applied to axial end of the center electrode, thereby causing the softer material of the heat dissipating core 342 to be squeezed or pushed through the opening 346 and expand and fill the volume in the interior of the electrode tip 344. This step will result in the creation of the core extension 362 with its extension tabs or ears 370, 372 extending beyond a side surface 348 of the electrode base 340 and expanding into the interior lobes or undercuts 380, 382 of the electrode tip, thus, creating the mechanical interlock mentioned above. Due to the large surface area interface between the core extension 362 and the electrode tip 344, there is a substantial amount of thermal coupling between these two components, which helps remove thermal energy away from the electrode tip. To ensure even a stronger bond, the electrode tip 344 could then be laser welded to the electrode base 340, but this is optional. Other embodiments are possible as well.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method for manufacturing a spark plug electrode, the spark plug electrode comprises an electrode base with a side surface, a heat dissipating core that is at least partially located within the electrode base, and an electrode tip, the process comprises the steps of:
    forming an opening in the side surface of the electrode base, the opening extends through the electrode base towards the heat dissipating core;
    metal working the electrode base and the heat dissipating core such that at least some material from the heat dissipating core is squeezed into the opening; and
    attaching the electrode tip to or forming the electrode tip on the side surface of the electrode base such that the electrode tip covers the opening, wherein the electrode tip is directly thermally coupled to the heat dissipating core through the opening.

2. The method of claim 1, wherein the method further comprises:
    providing an electrode stock piece that is elongated and has a round cross-sectional shape; and
    stamping, embossing, flattening and/or otherwise forming the electrode stock piece into an electrode stamped piece before carrying out the forming step, wherein the electrode stamped piece has a flat section on the side surface of the electrode base and the forming step further comprises forming the opening in the flat section.

3. The method of claim 1, wherein the method further comprises:
    providing an electrode stock piece that is elongated and has a rectangular or square cross-sectional shape before carrying out the forming step, wherein the electrode stock piece has a flat section on the side surface of the electrode base and the forming step further comprises forming the opening in the flat section.

4. The method of claim 1, wherein the forming step further comprises drilling, milling, machining and/or cutting the opening in the side surface of the electrode base.

5. The method of claim 4, wherein the forming step further comprises drilling or milling the opening in a flat section on the side surface of the electrode base to form a blind hole that extends completely through the electrode base and into the heat dissipating core.

6. The method of claim 1, wherein the metal working step further comprises stamping, embossing and/or flattening the electrode base and the heat dissipating core into an electrode formed piece such that at least some material from the heat dissipating core is squeezed into the opening, wherein the electrode formed piece has at least one flat section on the side surface of the electrode base and takes on a final, desired cross-sectional form of the spark plug electrode.

7. The method of claim 1, wherein the metal working step further comprises metal working the electrode base and the heat dissipating core to an extent that material from the heat dissipating core is squeezed into the opening but does not reach the side surface of the electrode base so that the material from the heat dissipating core is recessed from the side surface.

8. The method of claim 1, wherein the metal working step further comprises metal working the electrode base and the heat dissipating core to an extent that material from the heat dissipating core is squeezed into the opening and reaches the side surface of the electrode base so that the material from the heat dissipating core is flush with the side surface.

9. The method of claim 1, wherein the metal working step further comprises metal working the electrode base and the heat dissipating core to an extent that material from the heat dissipating core is squeezed through the opening and protrudes beyond the side surface of the electrode base.

10. The method of claim 1, wherein the attaching or forming step further comprises attaching the electrode tip to the side surface of the electrode base by laser welding around an outer periphery of the electrode tip such that the electrode tip covers the opening and directly contacts the material from the heat dissipating core that has been squeezed into the opening.

11. The method of claim 1, wherein the attaching or forming step further comprises attaching the electrode tip to the side surface of the electrode base by resistance welding the electrode tip such that the electrode tip covers the opening and directly contacts the material from the heat dissipating core that has been squeezed into the opening.

12. The method of claim 1, wherein the attaching or forming step further comprises forming the electrode tip on the side surface of the electrode base by additive manufacturing the electrode tip, layer by layer, such that the electrode tip covers the opening and directly contacts the material from the heat dissipating core that has been squeezed into the opening, the electrode tip includes a plurality of laser deposition layers.

13. The method of claim 1, wherein the attaching or forming step further comprises inserting a thermal coupling piece into the opening such that the thermal coupling piece directly contacts the material from the heat dissipating core that has been squeezed into the opening, and then attaching the electrode tip to or forming the electrode tip on the side surface of the electrode base such that the electrode tip covers the opening and directly contacts the thermal coupling piece.

14. The method of claim 1, wherein the attaching or forming step further comprises attaching the electrode tip to or forming the electrode tip on the side surface of the electrode base such that the electrode tip completely covers the opening and none of the material from the heat dissipating core is directly exposed to a sparking area.

15. The method of claim 1, wherein the electrode base includes a nickel-based material, the heat dissipating core includes a copper-based material, and the electrode tip includes a precious metal-based material.

16. The method of claim 1, wherein the spark plug electrode is a bridge-type ground electrode in the shape of a bar or strip, the bridge-type ground electrode is configured to attach to a free end of a shell at multiple locations and includes the electrode tip towards a middle of the ground electrode.

17. The method of claim 1, wherein the spark plug electrode is a J-gap ground electrode in the shape of a bent bar or rod, the J-gap ground electrode is configured to attach to a free end of a shell at a single location and includes the electrode tip towards a distal end of the ground electrode.

18. The method of claim 1, wherein the spark plug electrode is a center electrode, the center electrode is configured to be at least partially disposed within an axial bore of an insulator and includes the electrode tip towards a distal end of the center electrode.

19. A method for manufacturing a spark plug electrode, the spark plug electrode comprises an electrode base with a side surface, a heat dissipating core that is at least partially located within the electrode base, and an electrode tip, the process comprises the steps of:
   forming an opening in the side surface of the electrode base, the opening extends through the electrode base towards the heat dissipating core;
   applying a force to the electrode base and the heat dissipating core such that at least some material from the heat dissipating core is pushed into the opening; and
   attaching the electrode tip to or forming the electrode tip on the side surface of the electrode base such that the electrode tip at least partially covers the opening, wherein the electrode tip is directly thermally coupled to the heat dissipating core through the opening.

20. A method for manufacturing a spark plug electrode, the spark plug electrode comprises an electrode base with a side surface, a heat dissipating core that is at least partially located within the electrode base, and an electrode tip, the process comprises the steps of:
   forming an opening in the side surface of the electrode base, the opening extends through the electrode base towards the heat dissipating core;
   inserting a thermal coupling piece made from a thermally conductive material into the opening; and
   forming the electrode tip on the side surface of the electrode base by additive manufacturing the electrode tip, layer by layer, such that the electrode tip at least partially covers the opening, wherein the electrode tip is directly thermally coupled to the heat dissipating core through the opening via the thermal coupling piece.

\* \* \* \* \*